US010423755B2

(12) United States Patent
Cleasby et al.

(10) Patent No.: US 10,423,755 B2
(45) Date of Patent: Sep. 24, 2019

(54) SYSTEM AND METHOD FOR MOTOR CONTROL CENTER CONFIGURATION

(71) Applicant: ROCKWELL AUTOMATION TECHNOLOGIES, INC., Mayfield Heights, OH (US)

(72) Inventors: Shane Dean Cleasby, Mukwonago, WI (US); Elizabeth Walmsley Schrock, Germantown, WI (US); Steven Louis Fischer, Mequon, WI (US); Ken Sriri Rangsy, New Berlin, WI (US); Donald Dennis Skarda, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1422 days.

(21) Appl. No.: 14/337,767

(22) Filed: Jul. 22, 2014

(65) Prior Publication Data

US 2015/0032432 A1 Jan. 29, 2015

Related U.S. Application Data

(60) Provisional application No. 61/857,584, filed on Jul. 23, 2013.

(51) Int. Cl.
*H05K 7/00* (2006.01)
*H05K 7/14* (2006.01)
(Continued)

(52) U.S. Cl.
CPC .......... *G06F 17/5086* (2013.01); *G06F 17/50* (2013.01); *G06Q 10/06* (2013.01);
(Continued)

(58) Field of Classification Search
CPC .. G06F 17/5086; G06F 17/50; G06F 2217/02; G06F 2217/04; G06Q 50/04;
(Continued)

(56) References Cited

U.S. PATENT DOCUMENTS 6,629,044 B1 * 9/2003 Papallo, Jr. ......... G06F 17/5036
324/424
6,894,452 B2 * 5/2005 Mayhew ............. G05B 19/409
318/569

(Continued)

OTHER PUBLICATIONS

Extended European Search Report dated Mar. 5, 2015.
English et al: "Automated Engineering and Design Using Personal Computers", Sep. 11, 1989.

*Primary Examiner* — S. Sough
*Assistant Examiner* — Kimberly L Jordan
(74) *Attorney, Agent, or Firm* — Fletcher Yoder, P.C.

(57) ABSTRACT

Motor control centers are designed and configured by a series of interface screens that are served to a configuration computer. The system configuration may be based on a default configuration, and customization is made based upon user selection or input of data via the interface screens. The particular screens presented and the type and detail of data presented may be adapted so that more or less is available based upon a security access model. The system may be fully integrated with various other systems, such as enterprise resource planning tools. The system may be online, such that the interface, data, offerings, options and so forth may be easily adapted and updated, and design and configuration may be made by different parties at different locations with a minimum of specialized configuration computer programming.

19 Claims, 9 Drawing Sheets

(51) Int. Cl.
*G06F 17/50* (2006.01)
*G06Q 10/06* (2012.01)
*G06Q 50/04* (2012.01)

(52) U.S. Cl.
CPC ............... *G06Q 50/04* (2013.01); *H05K 7/00* (2013.01); *H05K 7/1498* (2013.01); *G06F 2217/02* (2013.01); *G06F 2217/04* (2013.01)

(58) Field of Classification Search
CPC ........ G06Q 10/06; H05K 7/00; H05K 7/1498; Y02T 10/82
USPC ............................................................. 703/7
See application file for complete search history.

(56) References Cited

U.S. PATENT DOCUMENTS

| 7,359,870 B1 | 4/2008 | Hadfield et al. |
| 2009/0276270 A1 | 11/2009 | Karnataka |
| 2010/0064375 A1* | 3/2010 | Gorczowski .......... G06F 3/0484 726/28 |

* cited by examiner

SYSTEM AND METHOD FOR MOTOR CONTROL CENTER CONFIGURATION

CROSS REFERENCE TO RELATED APPLICATIONS

This application claims priority from and the benefit of U.S. Provisional Application Ser. No. 61/857,584, entitled "SYSTEM AND METHOD FOR MOTOR CONTROL CONFIGURATION," filed Jul. 23, 2013, which is incorporated by reference herein in its entirety for all purposes.

BACKGROUND

The invention relates generally to the field of electric motor control, and more particularly to the configuration of motor control centers (MCCs).

Many industrial and other environments make extensive use of electric motors of various types for driving loads. In modern industrial settings, many such motors may be driven, and their operation may be coordinated with one another and with a range of machine, process, material handling and other equipment, as well as with human operators. MCCs are commonly used to house the electrical components used to drive and control the motors, such as motor drives, circuit breakers, switchgear, relays, automation controllers, human interfaces, and so forth. In a typical application, many such components may be disposed in a single cabinet, and the cabinet may include one or more sections or bays where the components are disposed. Power and network wiring is routed to and from the bays to communicate power and data to and from the equipment.

Most MCCs are engineered systems in which the sections, bays, electrical components, and/or other supporting equipment are configured for a specific application, such as for a specific application within a particular industry. Further, the MCCs are then assembled to meet the requirements of that application. In many factories, for example, different types and ratings of motors are used for different loads, and the drive and control of the various motors may be affected by one or multiple MCCs designed to handle the particular needs of the loads. Historically, the design and layout of the various elements of the MCCs were designed by human selection and typically based on prior knowledge and expertise. Increasingly, however, tools have been adapted to facilitate the vast array of decisions that are made during the design and configuration process. In some cases, the information used for initial design and layout may be used for cost estimating, production management, component ordering, assembly, and commissioning.

There remains a need for improved tools for the design and configuration MCCs that will further improve and facilitate system design, component selection, customization, and initial programming. Furthermore, there remains a need for improved tools for the design and configuration of MCCs that will further improve and facilitate the estimation of manufacturing, shipping, handling, costs.

BRIEF DESCRIPTION

In one embodiment, a MCC configuration system is provided. The MCC configuration system includes a cloud/server system configured to store a configuration/design tool and one or more design libraries. Each design library comprising default custom modifications selected by an operator for the design of a configured MCC system. The configuration/design tool comprises a series of interface screens that solicit configuration options from the operator. The MCC configuration system includes a processor configured to execute the configuration/design tool. The processor receives the configuration options from the operator via an operator interface. The MCC configuration system includes memory circuitry that stores data representative of the configuration options received from the operator and the default custom modifications selected by the operator in an electronic file specific to the configured MCC system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
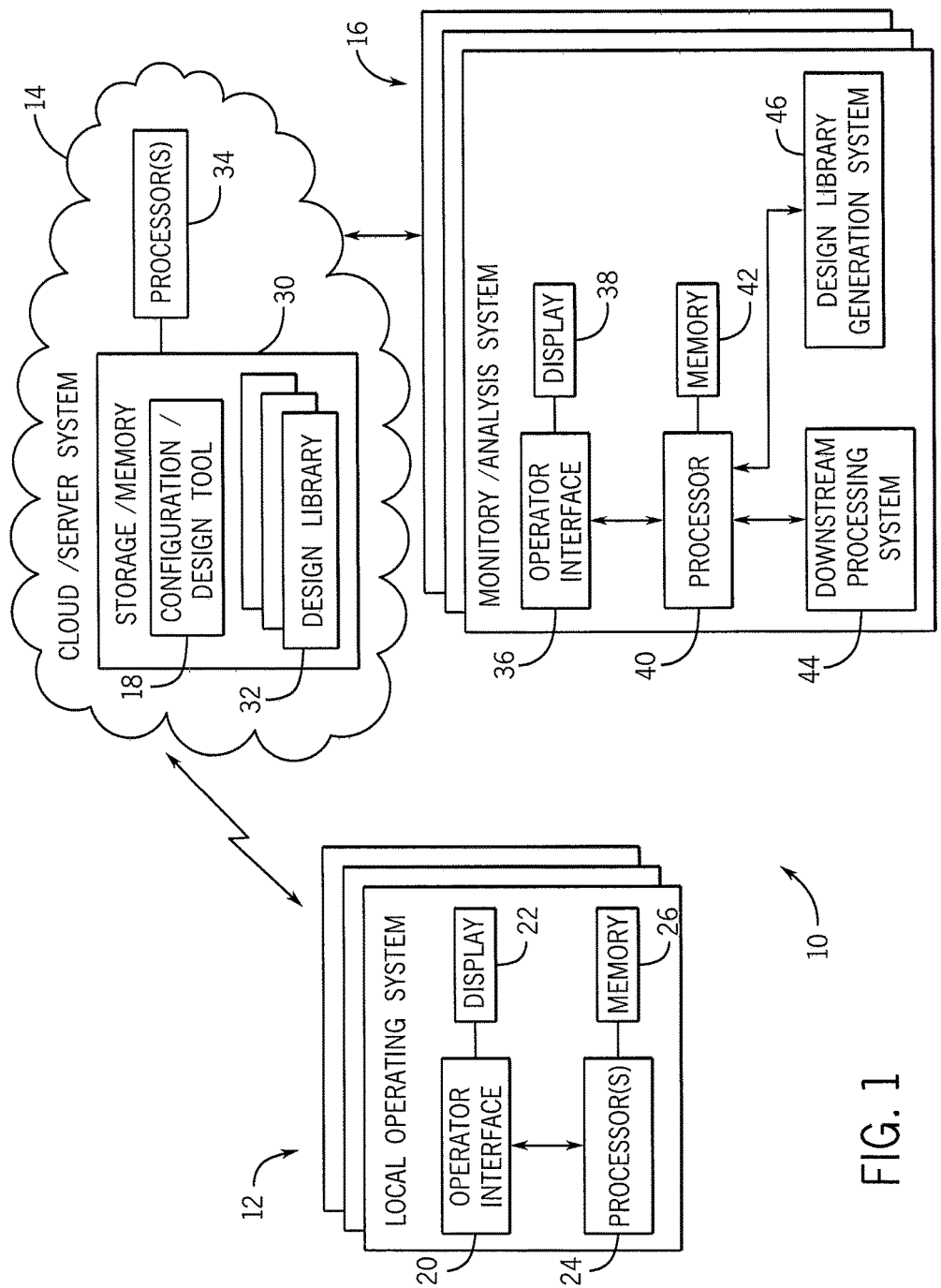
FIG. 1 is a block diagram of an embodiment of a motor control center (MCC) configuration system depicting a local operating system, a cloud/server system, and a monitoring/analysis system, in accordance with an embodiment.

FIG. 1 is a block diagram of an embodiment of a motor control center (MCC) configuration system 10 depicting one or more local operating systems 12, a cloud/server system 14, and one or more monitoring/analysis systems 16, in accordance with an embodiment. In particular, the MCC configuration system 10 may be utilized by a user and/or operator (e.g., end user, consumer, engineer, distributor, etc.) to design and configure the features and components of a MCC unit for a specific application, such as, for example, a specific application within a particular industry. Indeed, the design and complexity of an MCC may be dictated by the application and/or the task(s) the MCC is utilized for. Accordingly, the systems and methods disclosed may be used by different entities for different purposes, such as by end users, engineering, or consumers familiar with controlled processes, as well as by distributors and specialists with greater knowledge of particular components and subsystems. Further, the systems and methods disclosed may be utilized within many commercial and/or industrial applications, such as, for example, the cement industry, the water and waste water industry, the oil and gas industry, mining and metals industry, chemical industries, and so forth.

In certain embodiments, the user (e.g., end user, consumer, engineer, distributor, etc.) may access and execute, via a local operating system 12, a configuration/design tool 18 stored within a storage/memory 20 on the cloud/server system 14. The local operating system 12 may be any local computing device (e.g., smart phone, tablet, general purpose computer, laptop computer, etc.). The local operating system 12 may include an operator interface 20, such as a graphical user interface (GUI) that may enable the user to interact with the local operating system 12 via a display 22. In certain embodiments, the local operating system 12 may include one or more processors 24 configured to execute various computer executable instructions, such as computer executable instructions stored within a memory 26. In particular, the processor 24 may access, retrieve, and locally execute the computer executable instructions of the configuration/design tool 18, which may be stored on the cloud/server system 14.

In certain embodiments, the local operating system 12 may be utilized to virtually implement and execute the configuration/design tool 18 on the cloud/server system 14. The configuration/design tool 18 may be a series of interface screens for the design of a configured MCC system. The cloud/server system 14 may be a cloud-accessible platform (i.e., cloud-computing system), one or more servers, in various computing devices (e.g., general purpose computers), and the like. As such, the local operating system 12 may operate as a soft controller or as a processor running in the cloud/server system 14. Specifically, the cloud/server system 14 may include a storage/memory 30 configured to store computer executable instructions, such as the configuration/design tool 18, and one or more design libraries 32. Each of the one or more design libraries 32 may include information that may be utilized by the user to help configure and design an MCC. In addition, the cloud/server system 14 may include one or more processors 34 configured to access, retrieve, and execute the configuration/design tool 18 stored within the memory/storage 30 of the cloud/server system 14.

In certain embodiments, by virtually implementing the configuration/design tool 18 in the cloud/server system 14, the configuration/design tool 18 may use a distributed computing architecture to provide a number of users access to the same system and data. As more data is made available to the cloud/server system 14, the configuration/design tool 18 may provide additional design options to the users based on the actions or designs undertaken by other users. For example, as additional design libraries 32 are added to the memory/storage 30 of the cloud/server system 14, more data may be accessed by the user designing and configuring the features and components of a MCC. Furthermore, in certain embodiments, the configuration/design tool 18 may restrict access to the data stored within the cloud/server system 14 based on the identity of the user. For example, a user within a particular industry or geographical region may have access to one or more design libraries 32 targeted towards that particular industry or region. Likewise, a user configured to generate or create the design libraries 32 and/or one or more components of a particular design library 32 may have greater access to the storage/memory 30.

In certain embodiments, the design library 32 may be stored within the cloud/server system 14 and may include a collection of data associated with design options, customization options, features, layout options, and/or overall configuration options of a MCC unit. Each design library 32 may be associated with a particular customer, geographical region, industry, a particular MCC application, or may be associated with any type of category that requires a MCC with particular features or limitations. Further, each design library 32 may include features, layout options, and/or design options for an MCC that is configured for a particular application and/or a particular industry. In this manner, a user utilizing the configuration/design tool 18 may have access to one or more libraries 32 that help streamline the customization and design configuration process of a MCC for the user. In some situations, the design library 32 may also be associated with a particular user or organization, and may include profile information consisting of identification information, a history of previous purchases, an industry type, a list of MCCs previously designed or configured and specifications for each, and one or more templates of previous MCCs configured or designed. Generally, each of the one or more design libraries 32 may have restricted access and security, and therefore can securely include various levels of information that would help a user configure and design a MCC unit.

In some embodiments, the MCC configuration system 10 also includes one or more monitoring/analysis systems 16. The monitoring/analysis system 16 may include a computing device and/or a collection of computing devices that may perform various processing or data analysis operations on the data generated by the configuration/design tool 18, data stored within the storage/memory 30, data gathered or provided by the local operating system 12, and so forth. The monitoring/analysis system 16 may include an operator interface 36, such as a graphical user interface (GUI) that may enable the user to interact with the monitoring/analysis 16 via a display 38. Further, the monitoring/analysis system 16 may include one or more processors 40 configured to execute various computer executable instructions, such as computer executable instructions stored within a memory 42. In certain embodiments, the monitoring/analysis system 16 includes a downstream processing system 44 configured to access, retrieve, and process various types of data stored within the cloud/server system 14, as further described with respect to FIGS. 3 and 6. Furthermore, the monitoring/analysis system 16 includes a design library generation system 46 configured to generate the design library 30 that may be stored within the cloud/server system 14 and accessed by one or more users utilizing the configuration/design tool 18. In certain embodiments, the design library generation system 46 may also be configured to generate various components (e.g., pieces of information) of each design library 30.

Keeping the foregoing in mind, the local operating system 12, the cloud/server system 14, and the monitoring/analysis system 16 may communicate with each other via a wired or wireless communication network. As mentioned above, the local operating system 12 may be configured to access, retrieve, and locally execute the configuration/design tool 18 that is stored within the cloud/server system 14. In some embodiments, the local operating system 12 may be a general purpose computer or controller that accesses and executes the configuration/design tool 18 within the cloud/server network 14.

Figure 2:
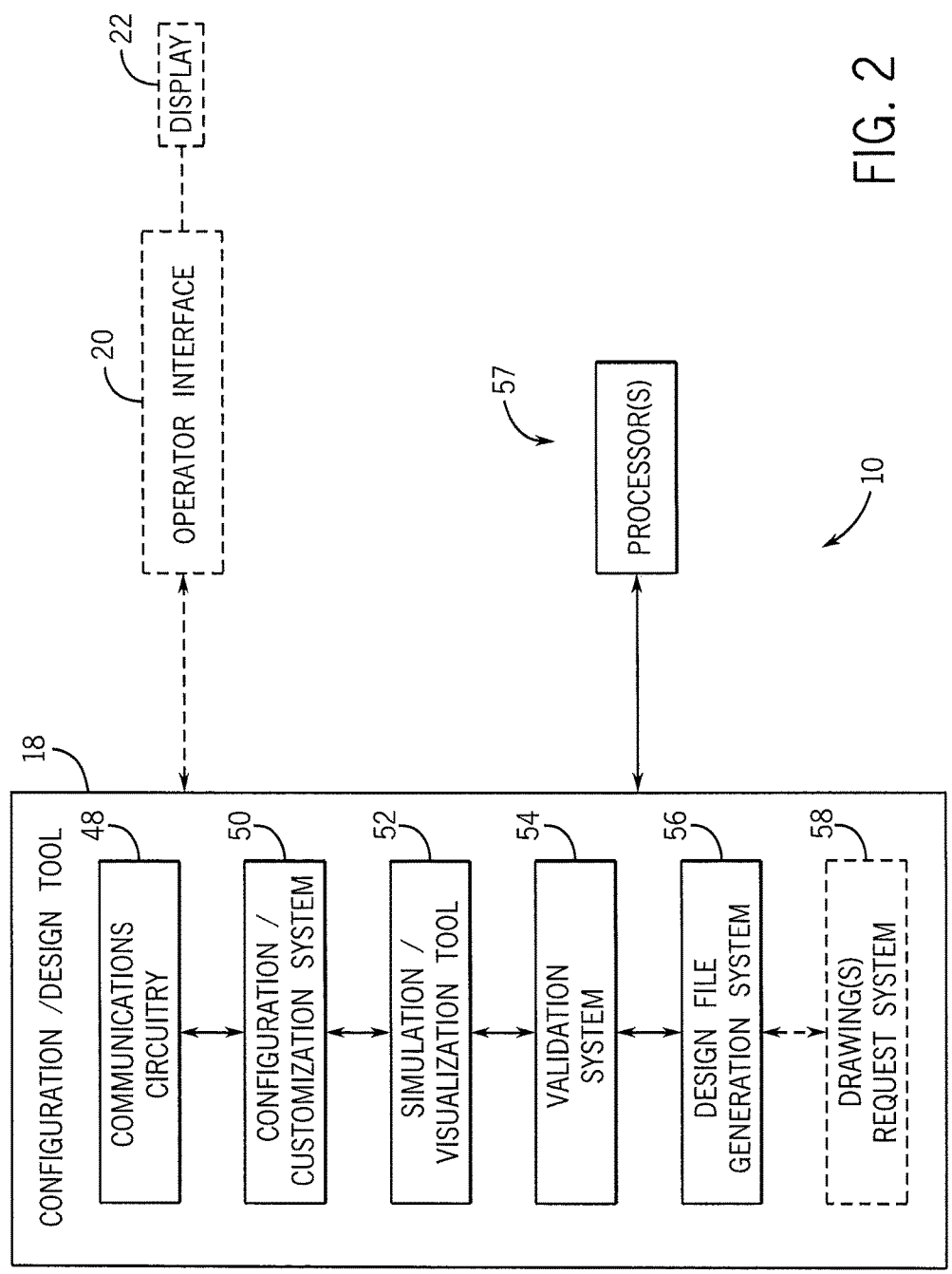
FIG. 2 is a block diagram of an embodiment of a configuration/design tool executed within the local operating system and/or the cloud/server system of FIG. 1, in accordance with an embodiment.

FIG. 2 is a block diagram of an embodiment of the configuration/design tool 18 stored within the cloud/server network 14 of FIG. 1, in accordance with an embodiment. As noted above, the configuration/design tool 18 may be executed within the local operating system and/or the cloud/server system of FIG. 1. Indeed, the configuration/design tool 18 is a interface screens for the design of a configured MCC. In particular, the configuration/design tool 18 may include communications circuitry 48, a configuration/customization system 50, a simulation/visualization tool 52, a validation system 54, and a design file generation system 56. In certain embodiments, the configuration/customization system 50 also includes a drawing(s) request system 58. It should be noted that the configuration/design tool 18 may be configured to help an operator design and configure an MCC with specifications or features suitable for a particular application and/or a particular industry.

As noted above, the processors 57 may be any type of computer processor or microprocessor capable of executing computer-executable code, such as the processor 34 or processor 24 (illustrated in FIG. 1). The processor 57 may also include multiple processors that may perform the operations described below. The operator interface 20 may include a number of input/output ports and the display 22. The display 22 may be used to display various images generated by configuration/design tool 18, such as a graphical user interface (GUI) for operating the configuration/design tool 18. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the configuration/design tool 18.

The communications circuitry 48 may include wireless and/or wired communication component that may facilitate communication between the configuration/design tool 18, the local operating system 12, the cloud/server system 14, and the monitoring/analysis system 16. For example, in one embodiment, the configuration/design tool 18 may use the communications circuitry 28 to communicatively couple the cloud/server system 14 to the local operating system 12 via a communication network.

In certain embodiments, the configuration/design tool 18 includes a configuration/customization system 50 (e.g., customization system 50). The configuration/customization system 50 may be an interactive system that allows the operator to design and customizes a wide variety of features of a MCC. The features or designs available for configuration may be provided as a category, and the operator may choose one or more preloaded values related to the categories. For example, some of the categories that may be available for configuration and design include, for example, customer information, wiring and enclosure information, incoming power information, bus work information, other MCC options, MCC unit specifications, and so forth. In addition, in some embodiments, additional features or designs available include common unit options where the operator may select options that apply globally to all combinations of controllers within the MCC being configured/designed. For example, examples of common unit options include, for example, auxiliary options (e.g., deviceNet starter auxiliary, unwired timer auxiliary contact, extra N.O. auxiliary on contractor, extra N.O. auxiliary disconnect means, N.O. auxiliary in circuit breaker, etc.), pilot devices, control and wiring, grounding and miscellaneous options, relays, SMCs, drives, PLCs, and so forth.

In certain embodiments, the configuration/customization system 50 may help the operator configure customer information for the MCC, such as the MCC assembly type, the country standards, an applicable IntelliCENTER network, the presence of a connection cover, whether the MCC is arc resistant, or any other customer specific information, such as, for example, a customer specific code. Further, wiring and enclosure information may be configured, such as a unit NEMA wiring type, a NEMA wiring class, a unit wiring diagram location, a section height, a mounting type, a section depth, an enclosure type, a bottom closing plate- NEMA 1/1G, a space heater voltage, an external mounting channel, a section wireway width, a section pull box, and so forth. In addition the operator may configure incoming power information for the MCC, such as an available fault current (e.g., between 1,000 and 100,000), a power system configuration, a system line voltage, a system line frequency (e.g., Hz), an MCC connection type, and so forth. Further, bus work information may be configured for the MCC, such as, for example, a horizontal power bus rating A, a power bus material (e.g., copper), a power bus plating (e.g., tin), a main power bus bracing (65 kA fully rated), a vertical power bus material (e.g., copper), a horizontal ground bus size, a ground bus plating, a horizontal ground bus location, a vertical ground bus type, a outgoing ground lug, an incoming ground lug size, an incoming ground cable size, a quantity of incoming ground cables, a horizontal neutral bus rating, a neutral loads served, a neutral connection plate in horizontal, a 600 A vertical bus, and so forth. In certain embodiments, the configuration/customization system 50 may help the operator configure MCC options, such as, for example, the presence of a vertical bus opening protection, a barrier between unit and wireway, a drip hood, a export pack (e.g., below deck), a vertical wireway tie bar, a vertical wwy door T-Handle latch, a NO-OX-ID compound on vertical bus, a MCC paint finish type, a master nameplate, and so forth. Further, unit specification information may be configured for the MCC, including a unit disconnecting type (e.g., circuit breaker), a unit door nameplate type (e.g., acrylic), a unit door nameplate color (e.g., white letters on black), a unit door nameplate line(s) (e.g., 1, 2, 3, 4, 5, 6, etc.), a blank unit door nameplate, a stainless steel NP screws, an external OL relay reset button, a control voltage type, a system control voltage, a heater element, and so forth.

As noted above, the configuration/customization system 50 allows the operator to design and customizes a wide variety of features of a MCC. In particular, in certain embodiments, certain features or design options may require user or operator input, while others may be defaulted to a predefined selection that need not be changed. Further, certain features or options may be automatically selected based in part on a previous selection by the operator. Further, certain features or designs options that were selected by the operator may conflict with features or designs selected by the operator at a later time, in which case the selected feature or option may be flagged for review. In addition, it should be noted that certain features or designs may be automatically be flagged for double review to ensure accuracy.

In certain embodiments, the configuration/design tool 18 includes a simulation/visualization tool 52 configured to display the selected features in the selected layout and configuration on the display 22. For example, in some embodiments, the operator may select an auto layout icon after selecting the desired features and/or options via the configuration/customization system 50. In some embodiments, after selecting the necessary or minimum features or options required, the configuration/design tool 18 may automatically layout the selected or designed MCC. The layout of the designed MCC may be displayed on the display 22 using one or more objects (e.g., blocks, rectangles, etc.) configured to provide an illustration of the layout of the MCC to the operator. In certain embodiments, the operator may select or preselect the layout options, or may leave the default layout options. For example, the operator may select the maximum number of sections per block, certain decisions outcomes (e.g., automatic correction in the event of a section bus overload), section numbering options, empty unit door options, font and font sizes, dimensions of blocks, legend options, and so forth. In some situations, the layout may include a section code legend with information related to the features or design options selected for the interior of each section. Indeed, the layout of the designed MCC may be displayed as illustrated with respect to FIGS. 9-10. In particular, the operator may change the placement of the sections within the layout by a "click" and "drop" operation. In this manner, the operator may change the automatic placement of one or more section to further design and configure the layout according to user specifications.

In certain embodiments, the configuration/design tool 18 includes a validation system 54 configured to validate the selected features and options within the selected layout and configuration. In particular, the validation may occur in real-time, such as during the configuration and design of the MCC, rather than during a manufacturing or commissioning phase. Further, the validation process may involve analyzing the features and options selected for the MCC with respect to one or more preset MCC design limitations or rules. Such design limitations or rules may be stored within the design library 32 of the cloud/server network 14, and may be dynamically changed or updated based on new information. In particular, the validation process may utilize the design limitations to provide different levels of feedback for the operator via the validation system 54. For example, in certain situations, the operator may receive a warning regarding a selected design option or layout option that prompts the operator to double check the validity of the selected option. In other situations, the operator may receive an error or an alert a selected design option or layout option that requires the operator to reselect a particular option so that the MCC is in line with a particular design limitation or rule. In other situations, the operator may receive informational messages from the validation system 54, which may inform the operator that the validation process was successful, or that the validation process requires additional forms of information.

With a successful validation of the MCC design and layout, the configuration/design tool 18 may allow the operator to generate a design file via the design file generation system 56. Indeed, in some embodiments, the design file generation system 56 provides a soft copy of the design and layout of the configured MCC, including the particular options, features, or specifications selected by the operator. The generated design file may be stored within the cloud/server system 14 and/or may be transferred to the local operating system 14 from the cloud/server system 12 via the communications circuitry 48. Further, in certain embodiments, the configuration/design tool 18 may allow the operator to request one or more drawings of the configured MCC via the drawing(s) request system 58. The request may be directly provided to the monitoring/analysis system 16 via the communications circuitry 48.

Figure 3:
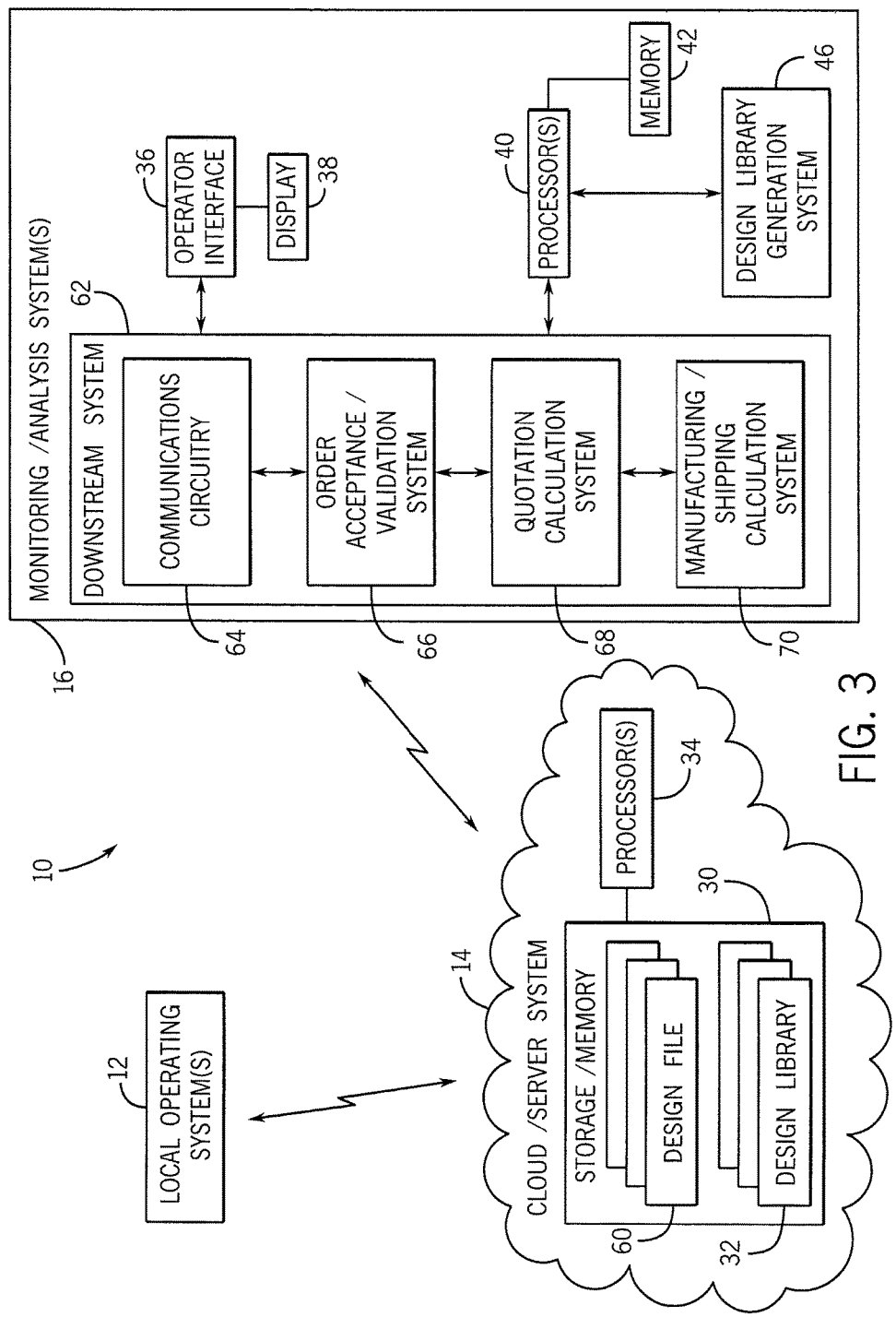
FIG. 3 is a block diagram of an embodiment of the monitoring/analysis system of FIG. 1, in accordance with an embodiment.

FIG. 3 is a block diagram of an embodiment of the monitoring/analysis system 16 of the MCC configuration system 10 of FIG. 1, in accordance with an embodiment. As noted above, one or more design files 60 generated by one or more operators utilizing the local operating systems 12 may be stored within the storage/memory 30 of the cloud/server system 14. In certain embodiments, an operator utilizing the monitoring/analysis system 16 may access and/or retrieve the design file 60 for further processing within the downstream system 62, as further described below. Indeed, the downstream system 62 may include communications circuitry 64, a order acceptance/validation system 66, a quotation system 68, and a manufacturing/shipping calculation system 70.

In certain embodiments, the order acceptance/validation system 66 of the downstream system 62 may be configured to validate the order and the details of the order. For example, the receiving operator may double check with the order generating operator whether the order details are accurate. In some embodiments, the order acceptance/validation system 66 involves ensuring that the rules and system requirements for the particular features and options selected by the user configuring the MCC are valid for order entry and manufacturing. Further, in certain embodiments, the downstream system 62 also includes the quotation calculation system 68. The quotation calculation system 68 may be utilized to calculate an estimated cost for the configured and designed MCC, based on the features and options selected by the operator and stored within the design file 60. Further, in certain embodiments, the downstream system 62 includes the manufacturing/shipping calculation system 70, which may be configured to estimate the time needed to manufacture the MCC designed and estimate the time needed to ship the manufactured MCC. In addition, the manufacturing/shipping calculation system 70 may also provide the required information to allow the downstream systems to accurately schedule the manufacturing and shipping dates based at least in part on the design file 60.

In particular, in certain embodiments, the monitoring/analysis system 16 includes the design library generation system 46. As noted above, the design library generation system 46 may be utilized by the operator to generate one or more design libraries 30 stored within the cloud/server system 14. In certain embodiments, the design library generation system 46 may also be configured to generate various components (e.g., pieces of information) of each design library 30. Further, it should be noted that the design library generation system 46 may also be utilized to edit the design library 30 and/or one or more components of the design library 30.

Figure 4:
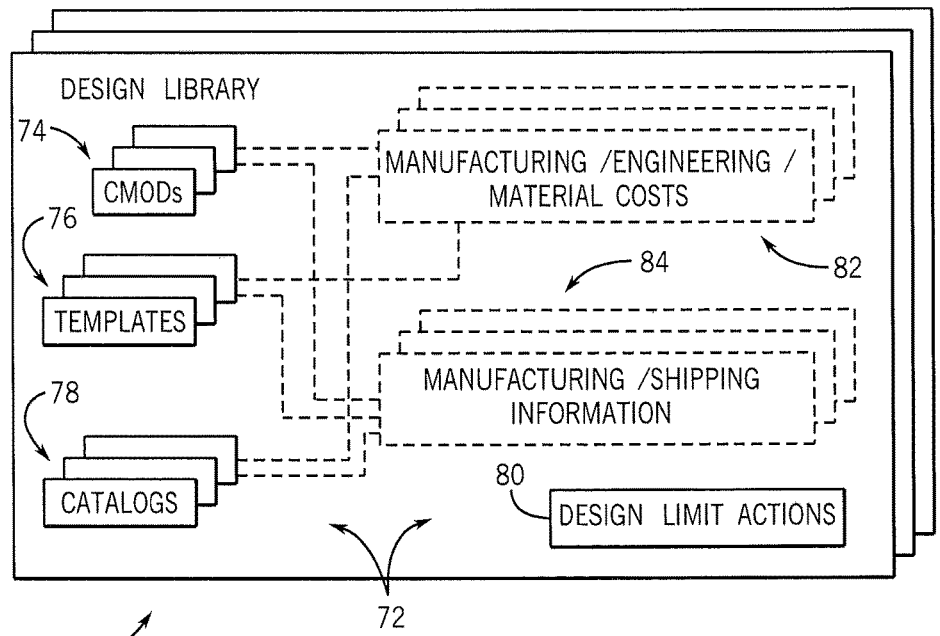
FIG. 4 is a block diagram of an embodiment of one or more design libraries utilized within the cloud/server system of FIG. 1, in accordance with an embodiment.

FIG. 4 is a block diagram of an embodiment of the one or more design libraries 32 utilized within the cloud/server system 14 of FIG. 1, in accordance with an embodiment. In particular, each design library 30 may include one or more design components 72 that are generated by the design library generation system 46, as noted above with respect to FIG. 3. In certain embodiments, the design components 72 may be utilized by the operator to help configure and design the MCC in line with desired specifications or features, such as particular specifications or features utilized for a particular industry or application. For example, the design components 72 may be any collection (e.g., set, group, category, etc.) of data associated with design options, customization options, features, layout options, and/or overall configuration options of a MCC unit. In the illustrated embodiment, the design components 72 include custom modifications 74 (e.g., CMODs 74), templates 76, and catalogs 78. It should be noted that in other embodiments, the design components 72 may include other information, such as design limitations 80, which may be utilized by the validation system 54 to validate the design and layout of the MCC.

In particular, each design library 32, and the associated design library components 72 within that design library 32, may be associated with a particular industry, a particular MCC application, or may be associated with any type of category that requires a MCC with particular features or limitations. For example, the design library components 72 within a particular design library 32 may include features, layout options, and/or design options for an MCC that is configured for a particular application and/or a particular industry (e.g., the cement industry, the water and waste water industry, the oil and gas industry, mining and metals industry, chemical industries, etc.). In this manner, a user utilizing the configuration/design tool 18 may access and retrieve the design library 32 that helps streamline the customization and design of a MCC for a particular application or industry. Likewise, the design components 72 accessed from the design library 32 may be utilized by the user as a guide in the process of designing and customizing the MCC. In some situations, the design library 32 and its' corresponding design components 72 are recommendations provided to the user within a particular industry to help streamline the design process for the user.

In certain embodiments, the design library components 72 include the CMODs 74, which are custom modifications 74 that are associated with predefined intelligence. For example, each CMOD 74 may be a collection of data including one or more design options, customization options, features, layout options, and/or overall configuration options for a particular MCC application or industry. For example, the CMOD 74 may include wiring and enclosure options, incoming power options, bus work options, unit specifications, or other MCC options for a MCC that will be utilized within the water industry. In such situations, the CMOD includes options and specifications that are suitable for this industry. When selected by the user, the CMOD 74 may automatically fill in the corresponding options and features otherwise selected during the design phase via the customization/configuration system 50.

In addition, in certain embodiments, the CMODs 74 may be associated with predefined intelligence, such as, for example, other collections of information that help the MCC configuration system 10 configure and commission the MCC. For example, each of the one or more CMODs 74 may be associated with manufacturing/engineering/material costs information 82 and/or manufacturing/shipping information 84. In this manner, when the operator selects a particular CMOD 74 to help streamline the design and configuration process, that CMOD 74 may include other information that may be utilized by the downstream system 62 within the monitoring/analysis system. As noted above, the downstream system 62 may calculate an estimated cost for the configured MCC, calculate shipping or manufacturing information for the configured MCC, and/or provide information required to schedule manufacturing or shipping dates for the configured MCC. In particular, mass price changes may be implemented easily by modifying or editing one or more existing manufacturing/engineering/material costs information 82 and/or manufacturing/shipping information 84, rather than modifying the CMOD 74 associated with the price change. Furthermore, the predefined intelligence may include expiration of prices, which a user may utilize while configuring and designing the MCC with one or more CMODs 74.

In particular, the CMODs 74 may provide improved adaptability to changes within industries on the design specifications required for MCCs. Indeed, the CMODs 74 may be easily updated, edited, or deleted based on various external situations via the design library generation system 46, and these changes may be inherently updated and communicated to a operator utilizing the design library 32. Likewise, the predefined intelligence may also be updated when the CMOD 74 is updated or edited. Accordingly, changing one or more design options, customization options, features, layout options, and/or overall configuration options within the CMOD 74 may also change the associated manufacturing/engineering/material costs information 82 and/or the manufacturing/shipping information 84.

In certain embodiments, the design components 72 also include one or more templates 76 and one or more catalogs 78. The template 76 may be a fully designed MCC that is specifically configured for a particular industry and/or a particular application. The user may utilize the template 76 and modify one or more features to further customize the MCC, or may utilize the template 76 without any further modifications. Likewise, the catalog 78 may be a series of templates 76 and/or CMODs 74 which allow the user to streamline the design process for a plurality of MCCs.

Figure 5:
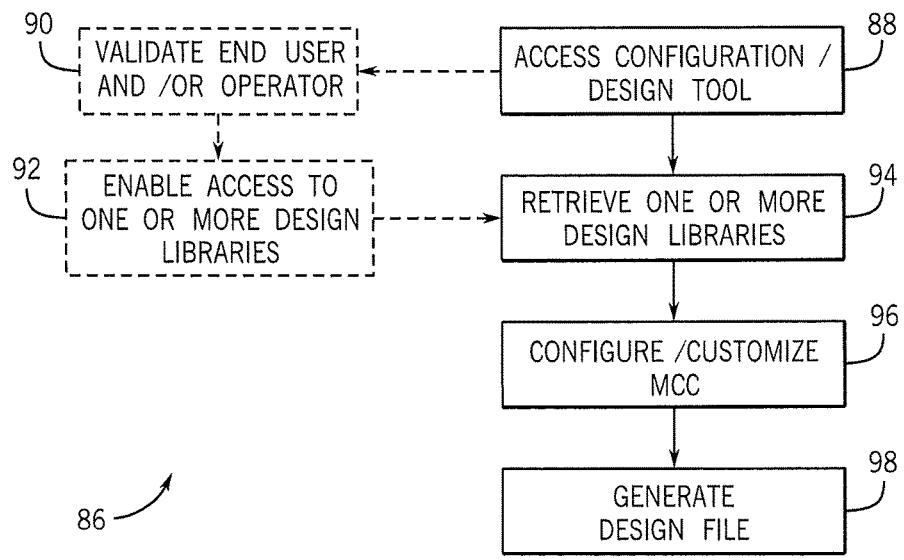
FIG. 5 is a flow chart of an embodiment of a method for generating a design file via local operating system 12 of FIG. 2, in accordance with an embodiment.

FIG. 5 is a flow chart of an embodiment of a method 86 for generating a design file via local operating system 12 of FIG. 2, in accordance with an embodiment. Although the method 86 is depicted in a particular order, it should be understood that the method 86 may be performed in a number of different orders and may not include all of the steps described herein. As noted above with respect to FIG. 2, the local operating system 12 may be configured to access the configuration/design tool 18 stored within the cloud/network system 14 (block 88). The configuration/design tool 18 may be retrieved and executed within the local operating system and/or remotely executed within the cloud/server system of FIG. 1.

In certain embodiments, the end user and/or operator accessing the configuration/design tool 18 may be validated, and access to the design libraries 30 may be provided or restricted based on the identity of the operator (block 90). For example, a user within a particular industry may have access to one or more design libraries 32 targeted towards that particular industry. Likewise, a user configured to generate or create the design libraries 32 and/or one or more components of a particular design library 32 may have greater access to the storage/memory 30. In this manner, a user utilizing the configuration/design tool 18 may have access to one or more libraries 32 that help streamline the customization and design configuration process of a MCC for the user. In certain embodiments, it should be noted that the user may not be granted access to the configuration/design tool 18, if the user requesting access is not a recognized user or operator. With successful validation of the user, the user may be granted access to one or more design libraries 32, and/or the corresponding design components 72 (block 92).

Indeed, the information accessed by the user may be utilized by the configuration/customization system 50 to help streamline and guide the MCC design process. For example, based on the CMOD 74 information retrieved from the design library 32, the method 86 includes efficiently configuring and customizing the MCC based on features or specifications desirable for a particular geographical region, industry or application (block 96). Furthermore, the method 86 includes generating the design file based on the configured and designed MCC (block 98).

Figure 6:
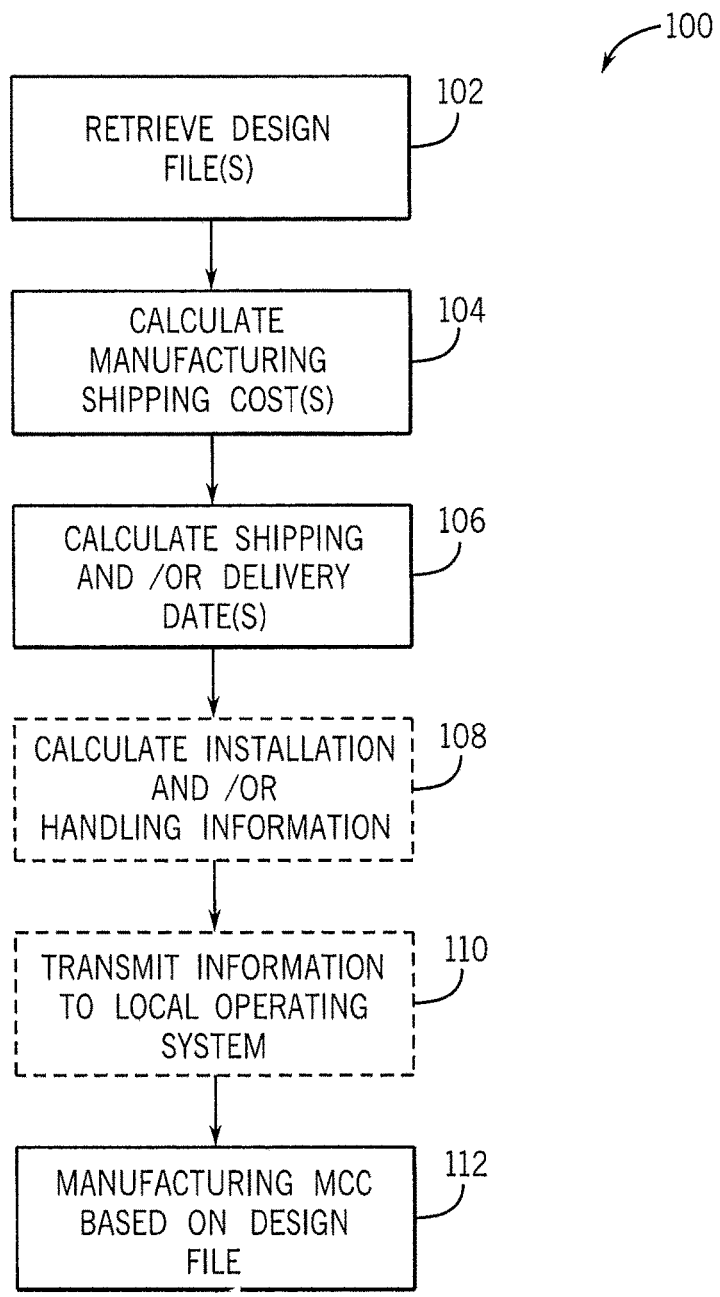
FIG. 6 is a flow chart of an embodiment of a method for manufacturing and shipping a MCC configured and designed via the configuration/design tool 18 of FIG. 1, in accordance with an embodiment.

FIG. 6 is a flow chart of an embodiment of a method 100 for manufacturing and shipping a MCC configured and designed via the configuration/design tool 18 of FIG. 1, in accordance with an embodiment. Although the method 100 is depicted in a particular order, it should be understood that the method 100 may be performed in a number of different orders and may not include all of the steps described herein.

As noted above with respect to FIG. 3, the monitoring/analysis system 16 may be configured to access the design file 60 stored within the cloud/network system 14 (block 102). Further, the retrieved design file 60 may be further processed via the downstream system 62. In particular, the downstream system 62 may be utilized to calculate an estimated manufacturing and shipping cost for the configured and designed MCC, based on the features and options selected by the operator and stored within the design file 60 (block 104). Further, the downstream system 62 may be utilized to calculate estimated shipping and delivery dates for the configured and designed MCC (block 106). It should be noted that in some situations, the manufacturing and shipping costs and/or the estimated shipping and delivery dates may be calculated based on the CMODs 74 selected by the user, and the associated predefined intelligence associated with the CMODs 74 (e.g., manufacturing/engineering/material costs 82 and/or the manufacturing/shipping information 84). In certain embodiments, the downstream system 62 may be utilized to calculate installation and/or handing information (block 108), based on the features and options selected for the configured MCC.

In certain embodiments, the method 100 includes transmitting the calculated information to the operator of the local operating system 12 that generated the design file 60 (block 110). In such embodiments, the operator may accept the order, including the pricing and delivery information, and may commission the manufacturing of a MCC that corresponds to the design file 60. In other embodiments, the design file 60 may already include the order information, and may be an indication that the MCC should be commissioned in line with the design file 60. Accordingly, the method 100 may include manufacturing the MCC based on the retrieved design file 60 (block 112).

Figure 7:
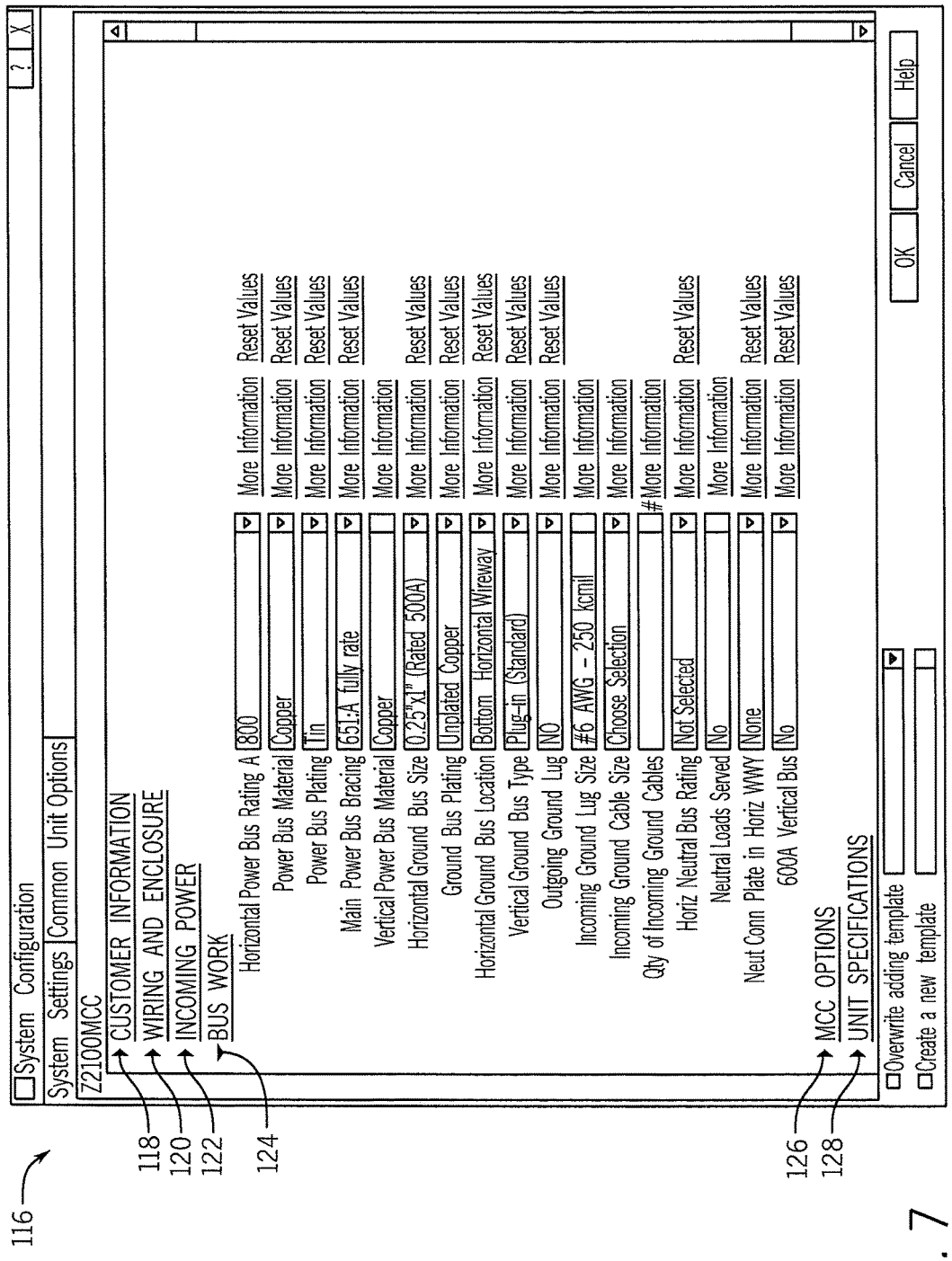
FIG. 7 illustrates an example operator interface view of the configuration/design tool of FIG. 2, in accordance with an embodiment.

FIG. 7 illustrates an example operator interface view 116 of the configuration/design tool 18 of FIG. 2, in accordance with an embodiment. Specifically, the operator interface view 116 may be displayed on the display 22, and be a visualization of the display 22 as the operator is utilizing the configuration/customization system 50. As noted above, the configuration/customization system 50 may be an interactive system that allows the operator to design and customizes a wide variety of features of a MCC. For example, some of the categories that may be available for configuration and design include, for example, customer information 118, wiring and enclosure information 120, incoming power information 122, bus work information 124, other MCC options 126, MCC unit specifications 128, and so forth. Specifically, bus work information 124 may be configured for the MCC, such as, for example, a horizontal power bus rating A, a power bus material (e.g., copper), a power bus plating (e.g., tin), a main power bus bracing (65 kA fully rated), a vertical power bus material (e.g., copper), a horizontal ground bus size, a ground bus plating, a horizontal ground bus location, a vertical ground bus type, a outgoing ground lug, an incoming ground lug size, an incoming ground cable size, a quantity of incoming ground cables, a horizontal neutral bus rating, a neutral loads served, a neutral connection plate in horizontal, a 600 A vertical bus, and so forth.

Figure 8:
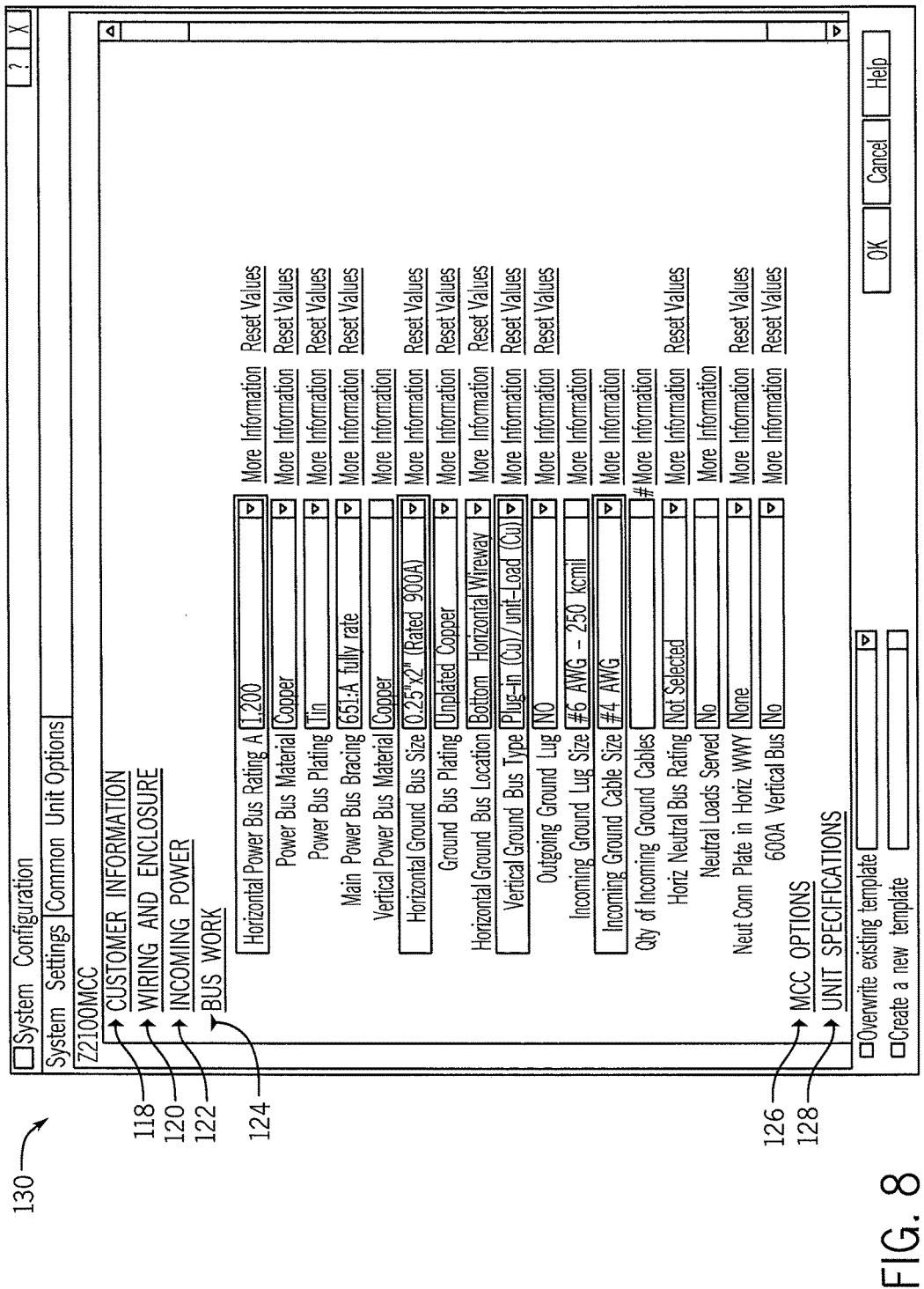
FIG. 8 illustrates an example operator interface view modified from the operator interface view of FIG. 7, in accordance with an embodiment.

FIG. 8 illustrates a example operator interface view 130 modified from the operator interface view 116 of FIG. 7, in accordance with an embodiment. In certain embodiments, the operator utilizing the configuration/design tool 18 may modify certain features or options to configure the MCC for use within a particular application or a particular industry. In particular, the operator interface view 130 may be one of a series of interface screens for the design of a configured MCC. Further, in certain embodiments, the operator may modify certain features or options that were automatically selected when the CMOD 74 and/or the template 76 is selected. Accordingly, as illustrated in FIG. 8, features of the bus work information 174 are modified by the user from a previous value.

Figure 9:
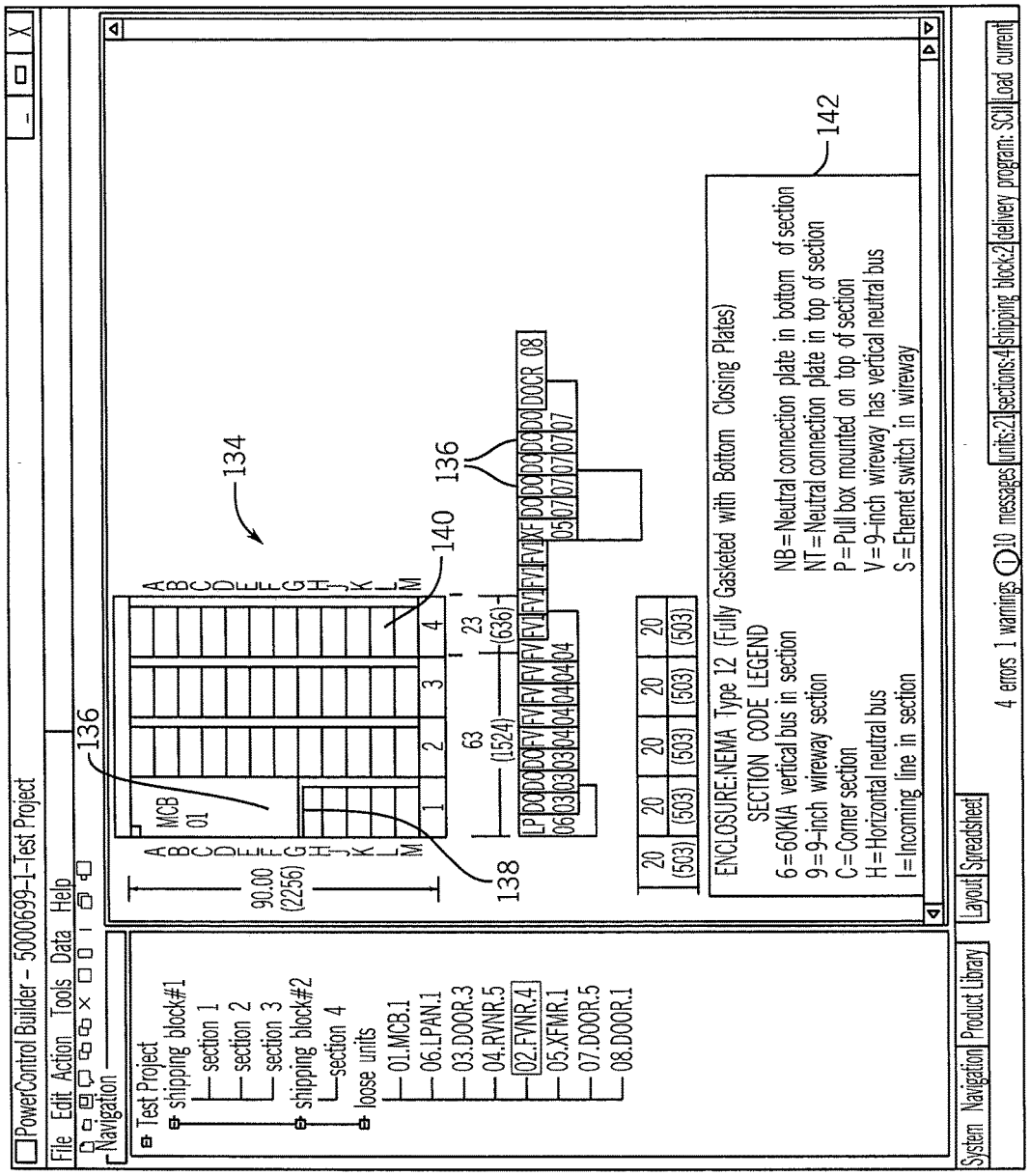
FIG. 9 illustrates an example operator interface view of the simulation/visualization tool of the configuration/design tool of FIG. 2, in accordance with an embodiment.

FIG. 9 illustrates an example operator interface view 132 of the simulation/visualization tool 52 of the configuration/design tool 18 of FIG. 2, in accordance with an embodiment. The simulation/visualization tool 52 may be configured to display the selected options and features for the MCC in a layout 134 on the display 22. The layout 134 of the designed MCC may be displayed on the display 22 using one or more objects 136 (e.g., blocks, rectangles, etc.) configured to provide an illustration of the layout of the MCC to the operator. Further, the objects 136 may include text to identify the interior features and options of the object 136. In particular, the operator may change the placement of the sections within the layout by a "click" and "drop" operation. For example, the operator may drag an object 136 from a first location 138 to a second location 140. In this manner, the operator may change the automatic placement of one or more section to further design and configure the layout 134 according to user specifications. In some situations, the layout 134 may include a section code legend 142 with information related to the features or design options selected for the interior of each object 136.

Figure 10:
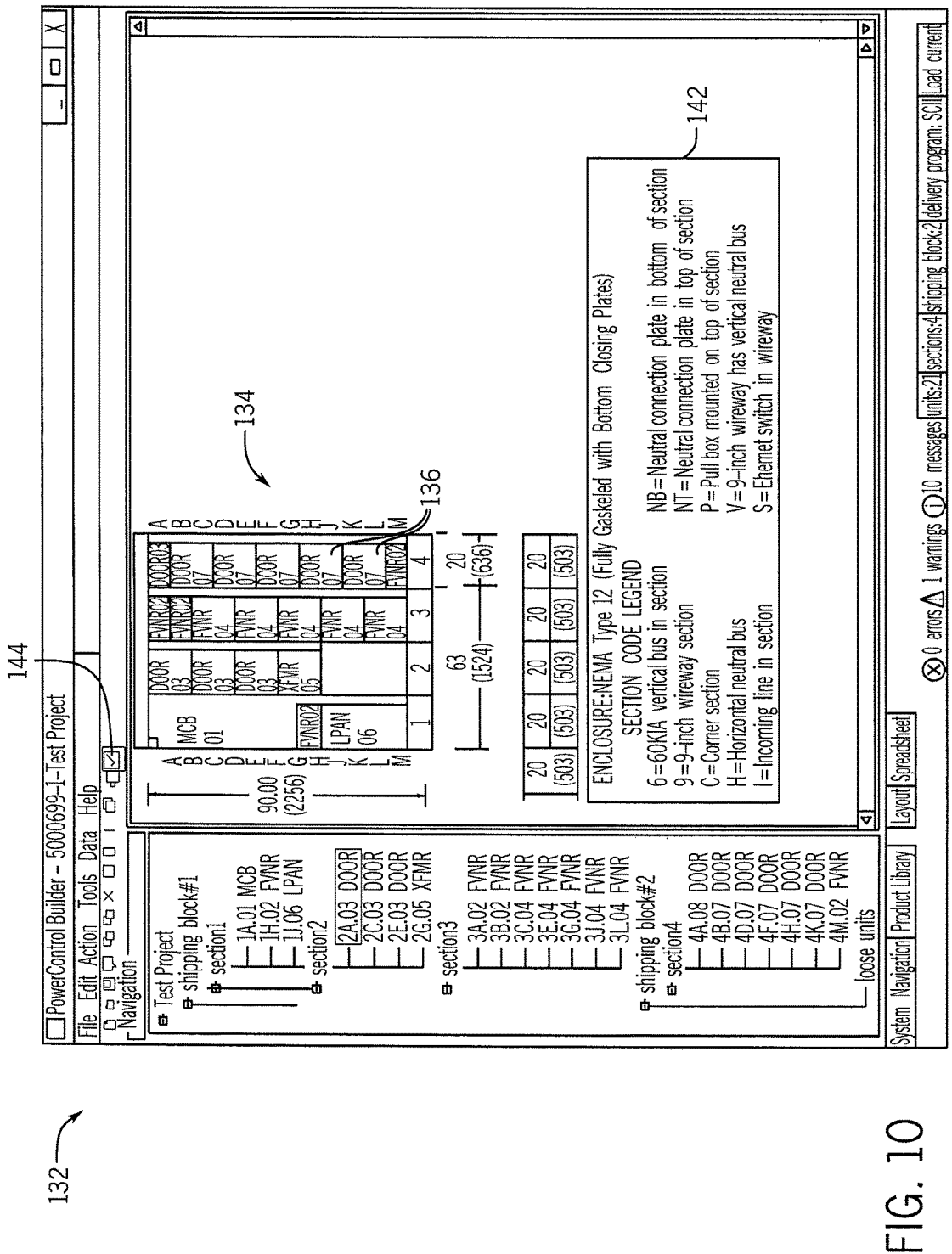
FIG. 10 illustrates an example operator interface view of the validation tool of the configuration/design tool of FIG. 2, in accordance with an embodiment.

FIG. 10 illustrates an example operator interface view of a validation tool 144 of the configuration/design tool 18 of FIG. 2, in accordance with an embodiment. As noted above, the configuration/design tool 18 includes a validation system 54 configured to validate the selected features and options within the selected layout and configuration. In particular, the validation may occur in real-time, such as during the configuration and design of the MCC, rather than during a manufacturing or commissioning phase. In particular, the validation tool 144 may be engaged by operator to engage the validation system 54 of the configuration/design tool 18.

The systems and methods may make use of certain aspects of existing technologies, such as those described in U.S. Pat. No. 7,359,870, entitled System Design, Proposal and Programming Method and Apparatus, issued to Hadfield et al. on Apr. 15, 2008; U.S. patent application publication no. 2009/0276270, entitled System Configuration Application and User Interface, filed by Karnataka on Sep. 29, 2008; and U.S. patent application publication no. 2012/0079003, entitled System and Method for Interfacing with an Enterprise Resource Planning System, filed by Somani et al. on Sep. 29, 2010, all of which are hereby incorporated into the present disclosure by reference.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor control center (MCC) configuration system, comprising:
    a cloud/server system, that in operation, stores a configuration/design tool and one or more design libraries, wherein each design library comprising custom modifications selected by an operator for the design of a configured MCC system, and wherein the configuration/design tool comprises a series of interface screens that solicit configuration options from the operator, wherein the options for configuring the custom modifications of the MCC system are restricted based at least in part on an identity of the operator;
    a processor configured to execute the configuration/design tool, wherein the processor receives the configuration options from the operator via an operator interface; and
    memory circuitry that stores data representative of the configuration options received from the operator and the custom modifications selected by the operator in an electronic file specific to the configured MCC system.

2. The system of claim 1, comprising a local computing system configured with the processor, wherein the local computing system is communicatively coupled with the cloud/server system.

3. The system of claim 1, wherein each custom modification comprises one or more configuration options utilized by the operator for the design of the configured MCC system for a particular industry or a particular application.

4. The system of claim 3, wherein the one or more configuration options comprise a MCC design option, a MCC customization option, a MCC feature, a MCC layout, or a combination thereof.

5. The system of claim 1, wherein each custom modification is associated with a predefined intelligence, and wherein the predefined intelligence comprises a design cost, a manufacturing cost, a shipping information, a manufacturing information, an engineering cost, a material cost, or a combination thereof.

6. The system of claim 1, wherein the predefined intelligence associated with each custom modification may be updated.

7. The system of claim 1, comprising a downstream processing system configured to access and retrieve the electronic file specific to the configured MCC system.

8. The system of claim 7, wherein the downstream processing system determines a manufacturing cost, shipping information, manufacturing information, or a combination thereof, based at least in part on the electronic file.

9. A motor control center (MCC) configuration method, comprising:
    executing, via a local computing system, a design/configuration tool stored within a cloud/server system, wherein the design/configuration tool comprises a series of interface screens for the design of a configured MCC system;
    receiving user access data, and validating a user based at least in part on the user access data;
    soliciting one or more configuration options from the user via the one or more interface screens, wherein the one or more configuration options are based at least in part on the user access data, and wherein at least one of the configuration options is based upon a selection made by the user on the same or a previously presented interface screen;
    selecting, via the local computing system, one or more design libraries stored within the cloud/server system, wherein each design library comprising custom modifications selected by the user for the design of the configured MCC system; wherein the options for configuring the custom modifications of the MCC system are restricted based at least in part on an identity of the operator; and
    storing data in an electronic file within the cloud/server system, wherein the data is representative of the selected configuration options and the selected custom modifications specific to the configured MCC system.

10. The method of claim 9, comprising restricting access to one or more design libraries based at least in part on the user access data.

11. The method of claim 9, comprising adapting the interface screens presented to the user based upon the user access data.

12. The method of claim 9, wherein each custom modification comprises one or more configuration options utilized by the user for the design of the configured MCC system for a particular industry or a particular application.

13. The method of claim 12, wherein the one or more configuration options are updated by the user selections made via the interface screens.

14. A non-transitory computer-readable medium comprising computer-executable instructions configured to:
    execute, via a first processor of a local computing system, a design/configuration tool stored within a cloud/server system, wherein the design/configuration tool comprises a series of interface screens for the design of a configured motor control center (MCC) system, wherein the series of interface screens are adapted based at least in part on an identity of an operator;
    generate, via the first processor, a design file comprising data representative of one or more selected configuration options and one or more selected custom modifications specific to the configured MCC system, wherein the options for configuring the custom modifications of the MCC system are restricted based at least in part on an identity of the operator; and
    retrieve, via a second processor of a monitoring/analysis system, the design file from the cloud/server system, wherein the design file is utilized to generate a shipping or a manufacturing information for the configured MCC system.

15. The non-transitory computer-readable medium of claim 14, wherein the computer-executable instructions are configured to solicit the one or more selected configuration options from the operator via the series of interface screens.

16. The non-transitory computer-readable medium of claim 14, wherein the one or more custom modifications are selected from one or more design libraries stored within the cloud/server system.

17. The non-transitory computer-readable medium of claim 16, wherein each custom modification comprises one or more configuration options utilized by the operator for the design of the configured MCC system for a particular industry or a particular application.

18. The non-transitory computer-readable medium of claim 14, wherein the computer-executable instructions are configured to calculate a manufacturing cost, a shipping information, a manufacturing information, or a combination thereof, for the configured MCC system.

19. The non-transitory computer-readable medium of claim 14, wherein the computer-executable instructions are configured to manufacture a MCC system based on the configured MCC system.

\* \* \* \* \*